United States Patent [19]
Zimek et al.

[11] Patent Number: 5,397,444
[45] Date of Patent: Mar. 14, 1995

[54] PROCESS FOR REMOVAL OF $SO_2$ AND $NO_x$ FROM COMBUSTION FLUE GASES AND AN APPARATUS USED THEREFOR

[75] Inventors: Zbigniew Zimek; Andrzej Chmielewski, both of Warsaw, Poland; Igor Artiuch; Georgii Lysow, both of Moscow, Russian Federation; Norman Frank, Greensburg, Pa.

[73] Assignees: Institute of Nuclear Chemistry and Technology, Warsaw, Poland; Ebara Corporation, Tokyo, Japan

[21] Appl. No.: 956,510

[22] Filed: Mar. 22, 1993

[30] Foreign Application Priority Data

May 21, 1991 [PL] Poland .................................. 290329
May 21, 1991 [PL] Poland .................................. 290330

[51] Int. Cl.$^6$ ............................................. B01D 53/00
[52] U.S. Cl. ............................ 204/157.3; 204/157.43; 204/157.46; 204/157.49; 422/186.04; 250/492.3
[58] Field of Search .......... 204/157.3, 157.43, 157.46, 204/157.49; 422/186.04; 250/492.3

[56] References Cited
U.S. PATENT DOCUMENTS 4,345,220  8/1982  Sullivan .................................. 331/79

FOREIGN PATENT DOCUMENTS 0 295 083  12/1988  European Pat. Off. .
0 308 505   3/1989  European Pat. Off. .
243216A    2/1987  Germany .
8702909    5/1987  WIPO .

*Primary Examiner*—John Niebling
*Assistant Examiner*—C. Delacroix-Muirheid
*Attorney, Agent, or Firm*—Oblon, Spivak, McClelland, Maier & Neustadt

[57] ABSTRACT

Removal of $SO_2$ and $NO_x$ from combustion flue gases is effected to be subjected to irradiation by an electron beam and to the action of microwaves applied in the form of a continuous and/or pulsed stream. The stream of flue gases irradiated by the electron beam in the radiation zone is subjected to the action of microwave energy in the whole cross section of the stream of the flue gases. This results in a decrease in the dose rate "average power of the electron beam" and a reduction in the costs of accelerators while retaining the same removal efficiency. Further, the apparatus for removal of $SO_2$ and $NO_x$ from combustion flue gases is provided in a radiation process in which a stream of accelerated electrons and microwave energy are used simultaneously.

21 Claims, 3 Drawing Sheets

PROCESS FOR REMOVAL OF $SO_2$ AND $NO_x$ FROM COMBUSTION FLUE GASES AND AN APPARATUS USED THEREFOR

BACKGROUND OF THE INVENTION

1. Field of Industrial Utility

The present invention concerns a process for removal of acid pollution such as $SO_2$ and $NO_x$ from flue gases by a radiation method, in particular from heat and power generating stations and an apparatus for removal of $SO_2$ and $NO_x$ from flue gases.

2. Discussion of the Background

Air pollution caused by gaseous products derived from combustion of coal and fossil fuels products in thermal-electric power stations present a problem of global proportions. A typical power station generating 500 MW of power emits about 3 to 5 tons pollution per hour which has a cumulatively detrimental effect on the environment. Several technologies have been developed to provide effective purification of flue gases.

The removal of acid pollution from flue gases by chemical methods is based on the absorption of acidic impurities in alkaline solutions i.e. lime suspensions. Those wet methods lead to deposition of large quantities of by-products, besides they allow elimination of $SO_2$ only. Substantial amounts of $NO_x$ still remains in the flue gases and in particular NO, together with Freon compounds is considered to be responsible for the ozone hole. As such, it is necessary to build separate plants for $NO_x$ removal from flue gases. Those plants are based on different principles, mainly on catalytic reduction.

Radiation technology uses a stream of accelerated electrons to generate free radicals. This leads to simultaneous $SO_2$ and $NO_x$ removal from flue gases.

The radiation method enables elimination of 95% of $SO_2$ and 80% of $NO_x$ in one plant. In the radiation technology it is important to increase efficiency of reactions which depends on the amount, temperature and composition of the gas mixture. A higher efficiency can be achieved by introducing moisture and a quantity of ammonia before conducting irradiation process as described in Polish Patent No. 153259 and Polish Patent Application No. 284996 filed on 27 Apr. 1990. Those methods are based on simultaneous reactions initiated by radiation and result in the formation of solid products. These products are useful as fertilizers.

The flue gas irradiation in the presence of water aerosols leads to the formation of atomic and molecular radicals and free electrons. Radicals OH., O. and $H_2O$. are responsible for oxidation of $SO_2$ and $NO_x$ to $SO_3$ and $NO_2$ and further in the presence of water $H_2SO_4$ and $HNO_3$ are formed. Finally these compounds react with ammonia to form solid products $NH_4NO_3$ and $(NH_4)_2SO_4$, which can be used as fertilizers. The temperature of this process is kept in the range of 65° to 100° C.

Optimalization of temperature, degree of watering and ammonia content depending on gas composition and its flow rate slightly change the efficiency of acid pollution removal from flue gas.

Research has also been conducted into improving the efficiency of radiation methods. Such improvements are based on additional use of electrostatic and electromagnetic fields, which could increase the amount of free electrons and free radials and change the chemical reaction process.

The known method described in Patent DD-243-216A, (87-170590) proposes using, (beside a beam of electrons with energy 5–500 KeV), an electrostatic field having an intensity up to 100 V/cm to reduce the consumption of electrical energy in the process. In this process purifying efficiency is increased. The disadvantage of this method is the necessity of using additional grid electrodes located in the reaction vessel. They are located at a distance of 16 cm one from the other to incorporate the electric field into the space where the reaction proceeds. The solid reaction products and fly ash formed during and after irradiation tend to be deposited on electrodes and block the reaction vessel.

The disadvantage of the method described above can be overcome by a method disclosed in Patent JO-1099-633-A, (89-156548/21) where an irradiation vessel laser beam is utilized (ArF laser with wavelength 193 nm) and $CH_3OH$ added. $CH_3OH$ is excited by light to generate OH. radicals which bond NO and $SO_2$ to solid products and enables their removal. The use of a laser beam has a beneficial effect but industrial application is complicated and expensive. Efficiency is rather low because of limited penetration of UV light in a reaction vessel caused by the presence of water. It is also difficult to obtain good homogeneity of spatial distribution of the light beam, and it is necessary to the use $CH_3OH$ compound.

The problem of reduction of electrical energy consumption is especially important in industrial scale installations because 2 to 4 per cent of total electrical energy produced in the power station is consumed for purifying flue gases from acid pollution.

SUMMARY OF THE INVENTION

The present invention uses along with an electron beam a microwave energy for increasing the effectiveness of the purifying process and for reducing the energy consumption for this purpose.

The essential feature of the process according to the invention is a secondary utilization of free electrons induced during irradiation and introduced to the system in the form of a beam of accelerated electrons for generating oxidizing radicals and the use of a microwave energy for increasing the number of free electrons and sustaining their energy to the optimum level. This results in a decrease in the dose rate average power of the electron beam and a reduction in costs of accelerators with the same removal efficiency.

Thus, the invention concerns a process for $SO_2$ and $NO_x$ removal from flue gases wherein a stream of flue gases is subjected to radiation by an electron beam and microwaves are applied in the form of a steady, continuous and/or pulsating stream. The stream of flue gases irradiated by the electron beam in the radiation zone is subjected to the action of microwave energy in the whole cross section of the stream of flue gases, and the microwaves are introduced with an electric field intensity of $E_1 > 300$ V/cm and pulse duration $\tau = 10^{-7}$ to $10^{-3}$ seconds at a frequency of 200 to 10,000 MHz. The frequency of repetition of the microwave pulses should be $f > v/a_k$, where v is a gas flow velocity, and $a_k$ is the length of the irradiated zone.

Alternatively a stream of steady, continuous microwave energy $E_c$ may be used simultaneously, and its intensity may be in the range 100 to 300 V/cm at a frequency 200 to 10,000 MHz.

The maximum applicable electron beam dose in this invention is 1-20 kGy. Of course dose is set according to required results. For instance, in the case that a reduction of pollution of about 50% is desired then the dose may be in a range 5-10 kGy.

The electron beam utilizes in a process may also be of a pulsed type, with a pulse duration of $\tau_e = 10^{-8}$ to $10^{-5}$ seconds.

The amount of ammonia added to the flue gases in the reaction vessel depends on the $SO_2$ and $NO_x$ content and should be about a stoichiometric amount. Water content preferably amounts to 8-12% volume and may be optimalized according to the situation pertaining in the system.

A further aspect of the invention concerns the apparatus for $SO_2$ and $NO_x$ removal from combustion flue gases in a radiation process in which a stream of accelerated electrons and microwave energy are used simultaneously. To achieve that purpose, the reaction vessel has to be provided with at least one electron beam source and at least one microwave source. The positioning of the microwave energy source and electron beam source is not critical. However, it is essential that an electron beam and microwaves are introduced to the same zone in the reaction vessel. The inlet of microwave energy may be installed at the axis of the reaction vessel and perpendicularly to the axis and in any suitable angle.

DETAILED DESCRIPTION OF THE INVENTION

Figure 1:
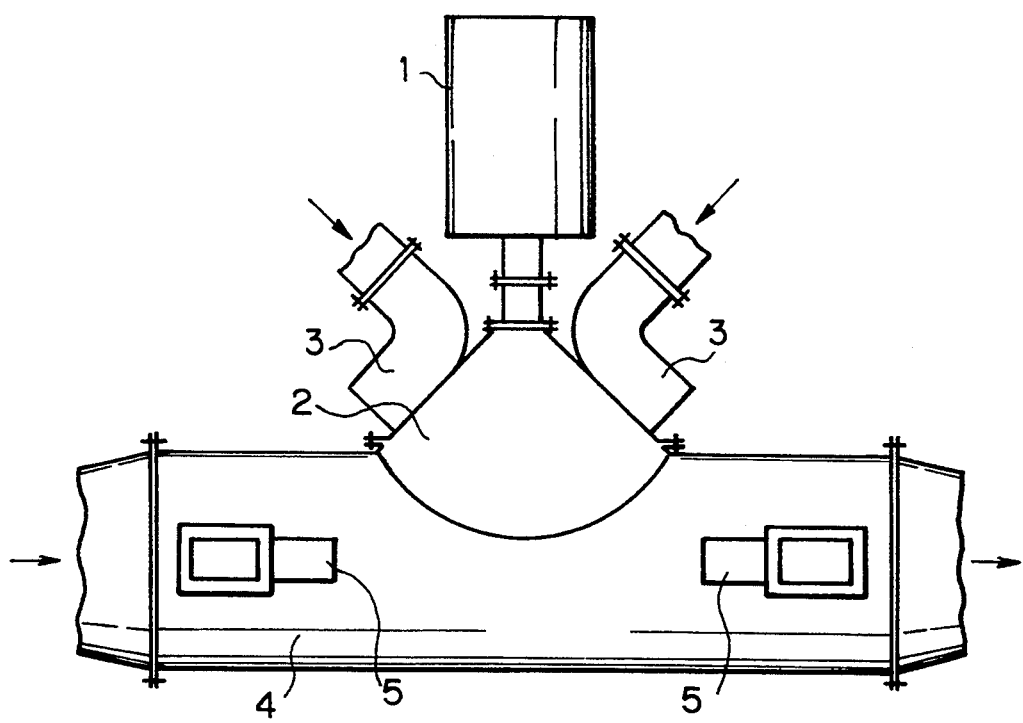
FIG. 1 is a schematic view showing an example of the reaction vessel with a concentrated electron beam according to the present invention.
Figure 2:
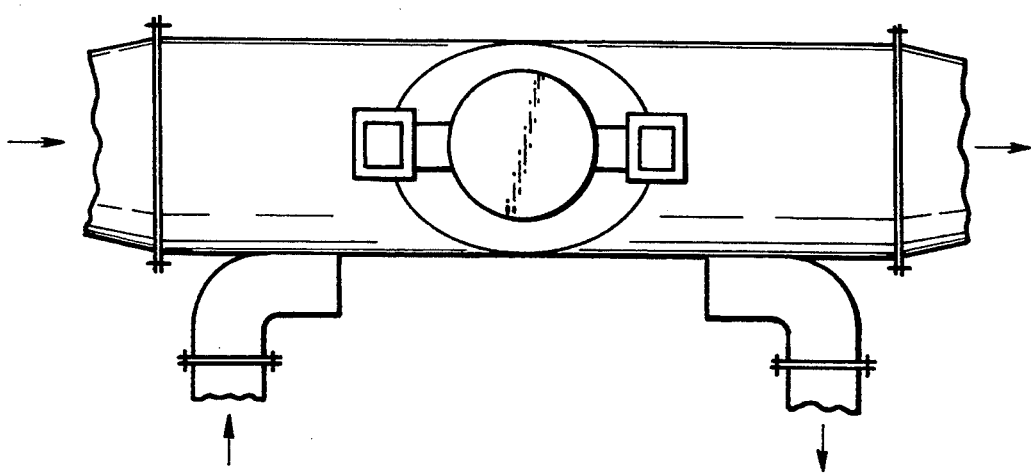
FIG. 2 is a schematic plan view of FIG. 1.
Figure 3:
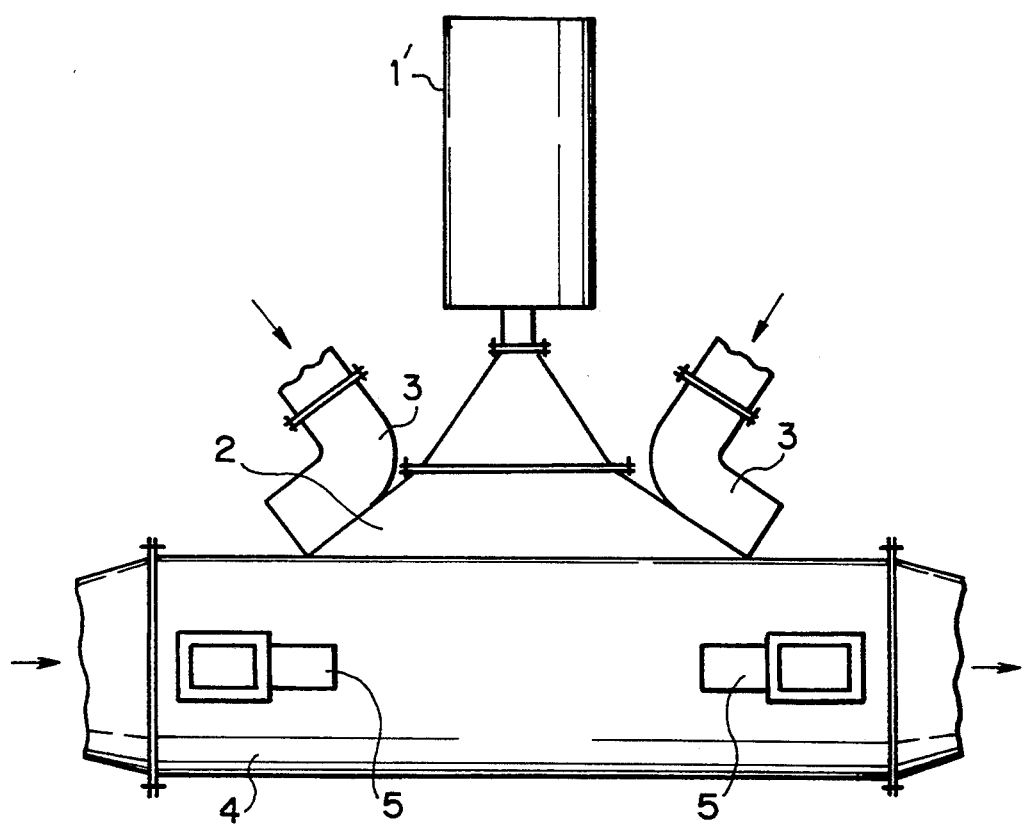
FIG. 3 is a schematic side view showing an example of the reaction vessel with an electron accelerator a linear scanning system mounted thereon according to the present invention.

The flue gas is processed before the entrance to a reaction vessel according to the standard procedures of the radiation method (filtering fly ashes particles, moistening, ammonia injection). Microwave energy having a frequency 200 to 10,000 MHz is additionally introduced to the reaction zone which is irradiated by electron beam and increases the number of free electrons and free radicals in this zone. This leads to better acid pollution removal from flue gases. The solid product of the process is collected by filtration. The electrical component of a microwave energy stream is involved in the processes in the reaction zone where flue gases are irradiated. The microwave energy is introduced to the reaction vessel, by inlet and outlet waveguides that are fixed on the side wall of the reaction vessel, into the stream of accelerated electrons. The connections are made in narrow sides of waveguides in the form of a rectangle. The apparatus which may be equipped with two additional waveguides, makes the purifying process more effective. In the preferred embodiment the microwave energy is introduced to the reaction vessel perpendicular to the axis of the reaction vessel, but it may be directed in any other angle depending on the geometry of a particular construction. As shown in FIGS. 1-3 the stream of microwave energy is incorporated into the reaction vessel 4 across its side wall in the same way as above mentioned to an electron beam by way of waveguides 5 where connections are made in narrow walls of waveguides. The presence of microwave energy pulses leads to an increased number of free electrons and free radicals in this volume, which makes the purifying process more effective.

To support the free electron energy, two additional waveguides 3 are installed on electron output chamber 2 between the reaction vessel 4 and accelerator 1 or 1'. The connections for the waveguides 3 are made in narrow walls of the waveguides 3 and the waveguides 3 are fixed to the two output arms of 3-dB device (microwave divider), where another arm is connected to a microwave fitted load (microwaves in this device are absorbed without being reflected) and the other one is fixed to a microwave generator. The steady stream of microwave energy may support the energy of free electrons taking part in the process. Generation of free radicals and purifying process are more efficient than in the prior art (German Patent DD 243 216 A1) process despite the fact that no additional electrodes are mounted in the reaction vessel.

According to the invention, beside the electron beam, the stream of microwave energy with frequency 200-10,000 MHz is used in the reaction vessel. The flue gas at the inlet of the reaction vessel is free of fly ash and moistened as in other radiation methods. The use of microwave energy increases the number of OH. radicals due to the presence of a higher number of free electrons as expressed by the following formula:

$$n_e = N_{eo} e^{\nu_i t}$$

wherein:
 $n_{eo}$ is a number of free electrons before use of the microwave energy
 $\nu_i$ is a number of ionizing collisions depending on the intensity of electrical field within the microwave energy pulse, and
 t is time.

The use of microwave pulses leads to a free electron multiplication effect whereas the steady stream of microwave energy sustains the energy of those free electrons at a desired level.

EXAMPLE

Figure 4:
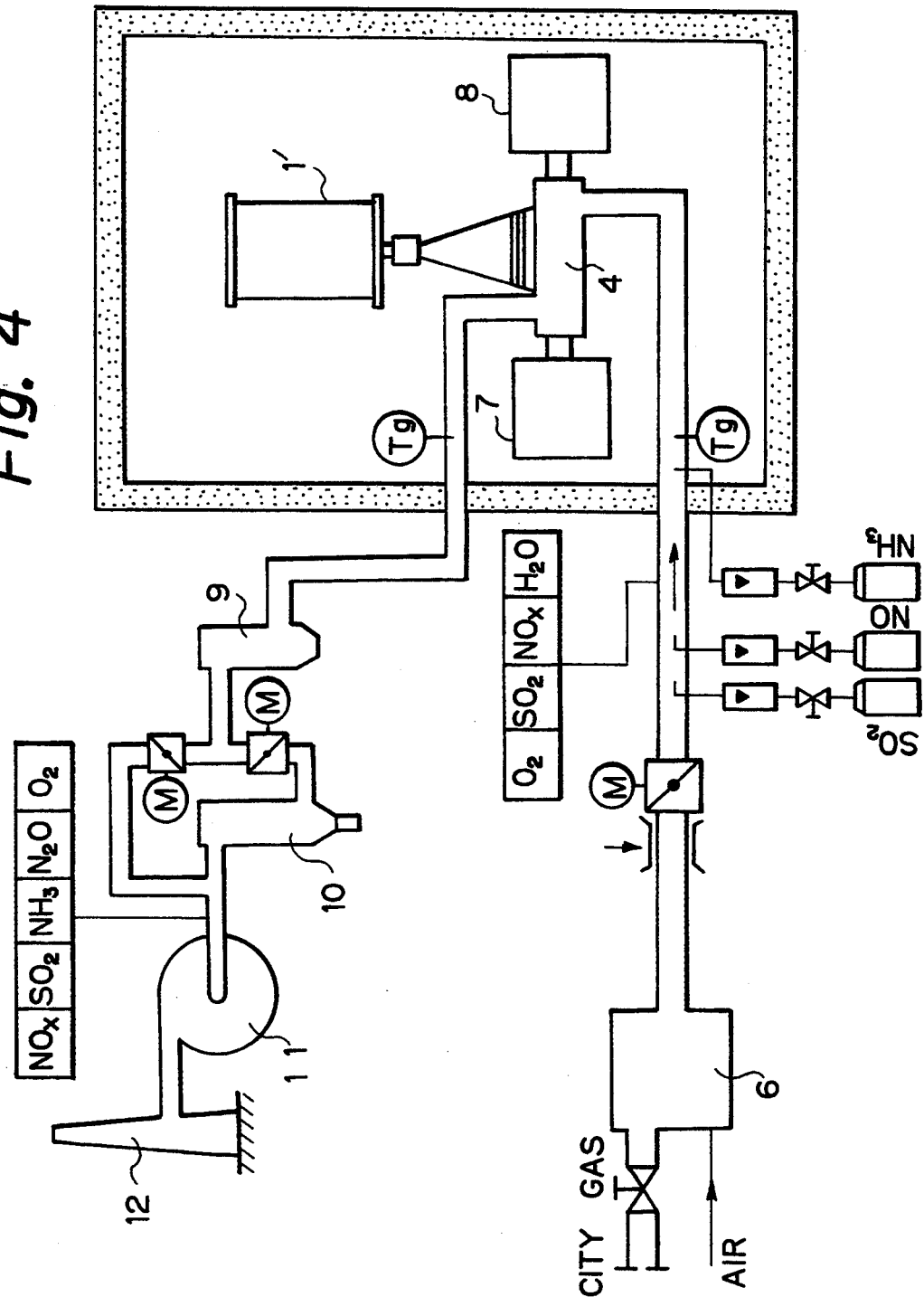
FIG. 4 is a flow diagram of a pilot plant according to the present invention.

The invention was tested in the installation shown in FIG. 4. The unit for $SO_2$ and $NO_x$ removal from flue gases has been built on the basis of an ILU 6 accelerator 1'. This installation was completed with two independent microwave generators. This arrangement allows testing of a combined removal concept based on the simultaneous use of the electron beam and streams of microwave energy to produce free radicals in a reaction vessel.

Two heating furnaces 6 each of them being a water-tube boiler were applied to produce combustion gas. The tested composition of flue gas has been obtained by introducing into the gas stream such components as $SO_2$, $NO$ and $NH_3$.

The installation is composed of an inlet system—two boilers housing a heating furnace, boiler pressure regulator, $SO_2$, $NO$ and $NH_3$ dosage system, analytical equipment—, a reaction vessel where an electron beam from an ILU 6 accelerator 1' and microwave streams from a pulse generator 7 and c.w. generator 8 can be introduced simultaneously or separately, and an outlet system—retention chamber 9, filtration Knit (e.g. bag filter), fan 11, offtake duct of gas 12 and analytical equipment. Temperature sensors are installed at several points in ducts and in the reaction vessel. The flow rate through the installation is 400 Nm³/h. The gas temperature in the reaction vessel can be adjusted in the range 70° to 100° C. by the cooling water system of the boiler.

The basic parameters of the sources of accelerated electrons and microwave energy streams are given in Table 1.

TABLE 1

| Parameter | accelerator | pulse generator | c.w. generator |
|---|---|---|---|
| electron energy | 0.7–2 MeV | — | — |
| frequency | — | 1.886 GHz | 2.45 GHz |
| repetition rate | to 50 Hz | to 200 Hz | — |
| peak power | 1 MW | 10 MW | — |
| pulse duration | 400 µs | 5 µs | — |
| average power | 20 kW | 25 kW | 5 kW |

The flue gas composition input to the reaction vessel is given in the Table 2 below.

TABLE 2

| Flue gas components | added components |
|---|---|
| $CO_2$ 6.1–7.4% | $SO_2$ up to 2000 ppm |
| $N_2$ 72.2–74.2% | NO up to 2500 ppm |
| $O_2$ 7.2–8.0% | $NH_3$ up to 4500 ppm |
| $H_2O$ 12.2% | |
| CO 48 ppm | |
| $NO_x$ 39 ppm | |

The flue gas was fed to the reaction vessel constructed in the form of a cylinder with a diameter of 200 mm. The microwave streams were propagated axially. The electron beam was introduced to the reaction volume perpendicularly to the axis of the vessel, passing a titanium window 50 µm thick. More than 75% of microwave energy was concentrated in the discharge volume. The inlet and outlet of the stream of the flue gas were situated on the wall side of the vessel. The stream of gas can flow directly or may be formed orbicularly. The temperature of the flue gas at the outlet of the reaction vessel was not higher than 100° C.

The tests were carried out to estimate the effectiveness of the elimination $SO_2$ and $NO_x$ from the flue gases and to estimate the reduction of the energy consumption to obtain the same purification effect with an electron beam only and electron beam combined with microwave energy applied as a continuous wave and/or in the form of pulsating source, using equal power levels of the microwave stream and electron beam deposited in the gas phase.

The efficiency of the flue gas purification effect at the same power consumption is shown in the Table 3 below.

TABLE 3

Improvements in the $SO_2$ and $NO_x$ Removal Efficiency at the same Input Power Requirements

| A. $SO_2$ removal efficiency $\eta$ $SO_2$ (%) | | | | | | | |
|---|---|---|---|---|---|---|---|
| Electron beam | 40 | 50 | 60 | 70 | 80 | 91 | 95 |
| Electron beam + microwaves | 57 | 66 | 72 | 81 | 89 | 92 | 97 |
| Absorbed total energy (kGy) | 1.0 | 1.3 | 2.1 | 2.7 | 3.4 | 4.6 | 5.5 |
| B. $NO_x$ removal efficiency $\eta$ $NO_x$ (%) | | | | | | | |
| Electron beam | 40 | 50 | 60 | 70 | 80 | | |
| Electron beam + microwaves | 53 | 62 | 68 | 77 | 86 | | |
| Absorbed total energy (kGy) | 2.1 | 3.1 | 4.0 | 5.25 | 7.0 | | |

Input power requirements for combination of electron beam and microwave is as follows:
$SO_2$ 95%—input power 5.5 kGy
$NO_x$ 80%—input power 7 kGy Reduction of power requirement with reference to dose in kGy under the same conditions is shown in Table 4 below. The same conditions mean that during the experiments all parameters concerning the amount and the composition of the gas used as well as temperature and pressure were the same.

TABLE 4

| Dose reduction in kGy | | | | | | | |
|---|---|---|---|---|---|---|---|
| Electron beam alone | 35 | 30 | 25 | 20 | 15 | 10 | 5 |
| Electron beam + microwaves | 25 | 23 | 19 | 16 | 12 | 8 | 4 |

The obtained results show that both the purification effect and reduction in power consumption make this method valuable.

The invention is defined in the enclosed patent claims. It is possible to effect various modifications on the basis of the claims without departing from the spirit of the invention.

Industrial Applicability

In a process for removal of acid pollution such as $SO_2$ and $NO_x$ from combustion flue gases, in particular, from heat and power generating stations, the present invention uses along with an electron beam a microwave energy for increasing the effectiveness of the purifying process and for reducing the energy consumption for this purpose.

We claim:

1. A process for removal of $SO_2$ and $NO_x$ from combustion flue gases, comprising the steps of:
   providing a stream of combustion flue gases;
   irradiating the stream of combustion flue gases with an electron beam; and
   irradiating the stream of flue gases with microwave radiation.

2. A process according to claim 1, wherein the stream of combustion flue gases flows through a reaction vessel and the steps of irradiating the combustion flue gases with the electron beam and the microwave radiation occur in the reaction vessel, and further comprising the step of:
   adding at least one of moisture and ammonia to the combustion flue gases prior to when the combustion flue gases enter the reaction vessel.

3. A process according to claim 1, further comprising the step of:
   collecting reaction product that is formed by chemical reactions between the chemicals in the stream of combustion flue gases due to the electron beam irradiation and microwave radiation.

4. A process according to claim 3, further comprising the step of:
   forming fertilizer from the reaction product.

5. A process according to claim 1, wherein the step of irradiating the stream of combustion flue gases with microwave radiation comprises irradiating the stream of combustion flue gases with pulsed microwave radiation.

6. A process according to claim 5, wherein the pulsed microwave radiation generates, in the stream of combustion flue gases, an electric field intensity of greater than 300 volts per centimeter, the duration of the pulsed microwave radiation is between $10^{-7}$ and $10^{-3}$ seconds, and a repetition rate, f, of the pulses of microwave radiation is greater than $v/a_k$, where v is defined as the gas flow velocity in the stream of combustion flue gases and $a_k$ is defined to be a length along the stream of combustion flue gases over which the electron beam and the microwave irradiation react with the stream of combustion flue gases.

7. A process according to claim 1, wherein the microwave radiation has a frequency between 200 and 10,000 MHz.

8. A process according to claim 5, further comprising the step of irradiating the stream of combustion flue gases with continuous microwave radiation, wherein the continuous microwave radiation provides an electric field intensity in the stream of combustion flue gases of less than 300 volts per centimeter and the continuous microwave radiation has a frequency of between 200 and 10,000 MHz.

9. A process according to claim 8, wherein the continuous microwave radiation, the pulsed microwave radiation, and the electron beam, spatially overlap in the stream of combustion flue gases in an overlap region.

10. A process according to claim 1, wherein the electron beam and the microwave radiation overlap in an overlap region in the stream of combustion flue gases.

11. A process according to claim 1, wherein the step of irradiating the stream of combustion flue gases with an electron beam comprises the step of irradiating the stream of combustion flue gases with a pulsed electron beam having a pulse duration of between $10^{-8}$ and $10^{-5}$ seconds.

12. A process according to claim 11, wherein the step of irradiating the stream of combustion flue gases with microwave radiation comprises irradiating the stream of combustion flue gases with pulsed microwave radiation, and
wherein the repetition rates of the pulsed electron beam and the pulsed microwave radiation are synchronized and the pulsed electron beam interacts with the stream of combustion flue gases upstream of where the pulsed microwaves interact with the stream of combustion flue gases.

13. An apparatus for removing $SO_2$ and $NO_x$ from a stream of combustion flue gases, comprising:
a reaction vessel including a reaction zone;
means for generating an electron beam, the means for generating electron beam being structurally connected to the reaction vessel such that electron beam generated by the means for generating an electron beam form an electron beam that is directed into said reaction zone;
means for generating microwaves, wherein the means for generating microwaves is connected to the reaction vessel such that microwaves generated by the means for generating microwaves are directed into said reaction zone;
means for transporting a stream of combustion flue gases to the reaction vessel and into the reaction zone.

14. An apparatus according to claim 13, wherein said means for transporting comprises a tube having first and second ends, the first end communicating with the reaction zone and the second end structured to receive the stream of reaction flue gases from a source of reaction flue gases.

15. An apparatus according to claim 14, further comprising a source of a stream of reaction flue gases that generates a stream of reaction flue gases.

16. An apparatus according to claim 15, wherein said source comprises a thermo-electric power generator.

17. An apparatus according to claim 16, wherein said thermoelectric power generator is structures to burn fossil fuels thereby generating combustion flue gases.

18. An apparatus according to claim 13, wherein the microwave energy is introduced into the reaction zone through a microwave waveguide that is oriented perpendicular to the direction of flow of the stream of combustion flue gases in the reaction zone.

19. A device according to claim 13, wherein the microwave energy is provided into the reaction zone by at least two microwave waveguides.

20. A device according to claim 19, further comprising two additional microwave waveguides that are disposed on opposite sides of the means for generating an electron beam such that they support free electrons in the stream of combustion flue gases.

21. An apparatus according to claim 20, wherein the two additional waveguides have narrow wall regions providing microwave windows to couple microwave energy into the reaction zone and have an output arm connected to a 3DB device thereby preventing reflections of microwaves back to the means for generating microwave radiation.

* * * * *

UNITED STATES PATENT AND TRADEMARK OFFICE
CERTIFICATE OF CORRECTION

PATENT NO. : 5,397,444
DATED : March 14, 1995
INVENTOR(S) : Zbigniew Zimek et al.

It is certified that error appears in the above-indentified patent and that said Letters Patent is hereby corrected as shown below:

On the title page, left-hand Column, line 14, after "Mar. 22, 1993" insert as follows:

-- [63] Filed as a continuation of PCT/JP 92/00651, May 21, 1992, now abandoned.--;

Column 1, line 6, after "BACKGROUND OF THE INVENTION" start a new paragraph and insert -- This is a continuation of International Application PCT/JP 92/00651 filed May 21, 1992, now abandoned.--.

Signed and Sealed this

Twenty-sixth Day of December, 1995

*Attest:*

BRUCE LEHMAN

*Attesting Officer*　　　*Commissioner of Patents and Trademarks*